US012658735B2

(12) United States Patent
Chen et al.

(10) Patent No.: US 12,658,735 B2
(45) Date of Patent: Jun. 16, 2026

(54) WIRELESS CHARGING FOR WEARABLE DEVICES WITH MAGNETIC ALIGNMENT FEATURES

(71) Applicant: Meta Platforms Technologies, LLC, Menlo Park, CA (US)

(72) Inventors: Baifeng Chen, San Jose, CA (US); Yewching Chen, Cupertino, CA (US); Zhongming Chen, San Carlos, CA (US); David Tao, Atherton, CA (US); Tony David, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 101 days.

(21) Appl. No.: 18/130,621

(22) Filed: Apr. 4, 2023

(65) Prior Publication Data

US 2023/0361601 A1    Nov. 9, 2023

Related U.S. Application Data

(60) Provisional application No. 63/339,781, filed on May 9, 2022, provisional application No. 63/339,767, filed on May 9, 2022.

(51) Int. Cl.
H02J 50/12      (2016.01)
G02B 27/01      (2006.01)
(Continued)

(52) U.S. Cl.
CPC ............ H02J 50/12 (2016.02); G02B 27/017 (2013.01); H02J 7/731 (2026.01); H02J 50/005 (2020.01);
(Continued)

(58) Field of Classification Search
CPC .......... H02J 50/12; H02J 7/0044; H02J 50/10; H02J 50/80
(Continued)

(56) References Cited

U.S. PATENT DOCUMENTS 9,961,433 B2      5/2018  Chawan et al.
10,599,181 B2     3/2020  Nazzaro et al.
(Continued)

FOREIGN PATENT DOCUMENTS

CN      108536300 B      7/2020
WO      2020173335 A1    9/2020

OTHER PUBLICATIONS

"CTN73x: NFC Wireless Charging Transmitter," NXP, 2023, 5 pages, Retrieved from the Internet: https://www.nxp.com/products/rfid-nfc/nfc-hf/nfc-charging/nfc-wireless-charging-transmitter:CTN73x.
(Continued)

*Primary Examiner* — Rexford N Barnie
*Assistant Examiner* — Swarna N Chowdhuri
(74) *Attorney, Agent, or Firm* — Morgan, Lewis & Bockius LLP

(57) ABSTRACT

According to examples, a charging interface for a wearable device may include a receiver coil arranged inside the wearable device; a transmitter coil arranged outside the wearable device, where the transmitter coil is to generate a charging voltage for the wearable device via magnetic induction with the receiver coil. The charging interface may include a first pair of magnets having respective polarity axes and positioned at top and bottom portions of the transmitter coil, and a second pair of magnets having respective polarity axes and positioned at top and bottom portions of the receiver coil. The polarity axes to may be aligned with an attachment plane between the transmitter coil and the receiver coil. Furthermore, the polarity axes of the first pair of magnets may be reversed with respect to corresponding second pair of magnets.

20 Claims, 16 Drawing Sheets

(51) Int. Cl.

| | |
|---|---|
| *H02J 7/00* | (2006.01) |
| *H02J 7/70* | (2026.01) |
| *H02J 50/00* | (2016.01) |
| *H02J 50/80* | (2016.01) |

(52) U.S. Cl.
CPC ...... *H02J 50/80* (2016.02); *G02B 2027/0178* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 2013/0120706 | A1 | 5/2013 | Kakinuma et al. | |
| 2016/0094076 | A1* | 3/2016 | Kasar ................... | H02J 7/0042 |
| | | | | 320/103 |
| 2017/0288443 | A1* | 10/2017 | Kursula ................. | H02J 50/12 |
| 2017/0331328 | A1* | 11/2017 | Yang ........................ | H04B 5/26 |
| 2021/0143672 | A1 | 5/2021 | Moubedi et al. | |
| 2021/0298440 | A1 | 9/2021 | Kim et al. | |
| 2022/0113925 | A1* | 4/2022 | Blaser ................... | H02J 50/005 |
| 2022/0320903 | A1* | 10/2022 | Lee ........................ | H02J 7/0044 |

OTHER PUBLICATIONS

Nakamura Y., et al., "SenStick: Comprehensive Sensing Platform with an Ultra Tiny All-In-One Sensor Board for IoT Research," Journal of Sensors, Oct. 26, 2017, vol. 2017, Article ID 6308302, 16 pages.

NuCurrent: "NFC Wireless Power Explained | Proof Points", YouTube, Sep. 30, 2021, 1 page, Retrieved from the Internet: https: https://www.youtube.com/watch?v=xcdNoDI2xAlab_channel=NuCurrent.

NuCurrent: "NuEva NFC Development Platform", YouTube, Mar. 5, 2021, 1 page, Retrieved from the Internet: https:https://www.youtube.com/watch?v=8RV1uKTGkeoab_channel=NuCurrent.

* cited by examiner

200A

WATCH 202

CHARGING INTERFACE 201

MAGNETIC ATTACHMENT 203

200B

WATCH 204

BATTERY 207

WATCH CHARGING INTERFACE 201

WATCH 204

CHARGER CHARGING INTERFACE 205

WATCH CHARGING INTERFACE 201

CHARGING INTERFACE 201

CHARGING INTERFACE 201

200C

208

300A

300B

300D

300F

372

374

376

378

379

370

400

500A

502

508

504

506

504

500D

WIRELESS CHARGING FOR WEARABLE DEVICES WITH MAGNETIC ALIGNMENT FEATURES

PRIORITY

This patent application claims priority to U.S. Provisional Patent Application No. 63/339,767, entitled "Wireless Charging For A Near-Eye Display," filed on May 9, 2022 and U.S. Provisional Patent Application No. 63/339,781, entitled "Wireless Charging For Wearable Devices," filed on May 9, 2022. Disclosures of the Provisional patent applications are incorporated by reference hereby.

TECHNICAL FIELD

This patent application relates generally to charging of wearable devices, and more specifically, to wireless charging for a near-eye display, a smartwatch, a controller, and similar devices utilizing various transmitter-receiver coil pair configurations.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

Wearable devices, such as augmented reality (AR) eyewear or glasses, smartwatches, handheld controllers, and similar ones may include any number of electrical components. One challenge with such devices may involve powering electrical components. For user-friendly utilization, a wearable device may include a battery or set of batteries, which may be charged through a wired and/or a wireless connection. Each approach may present its own challenges such as location of charging interface, efficiency of charging interface, etc.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
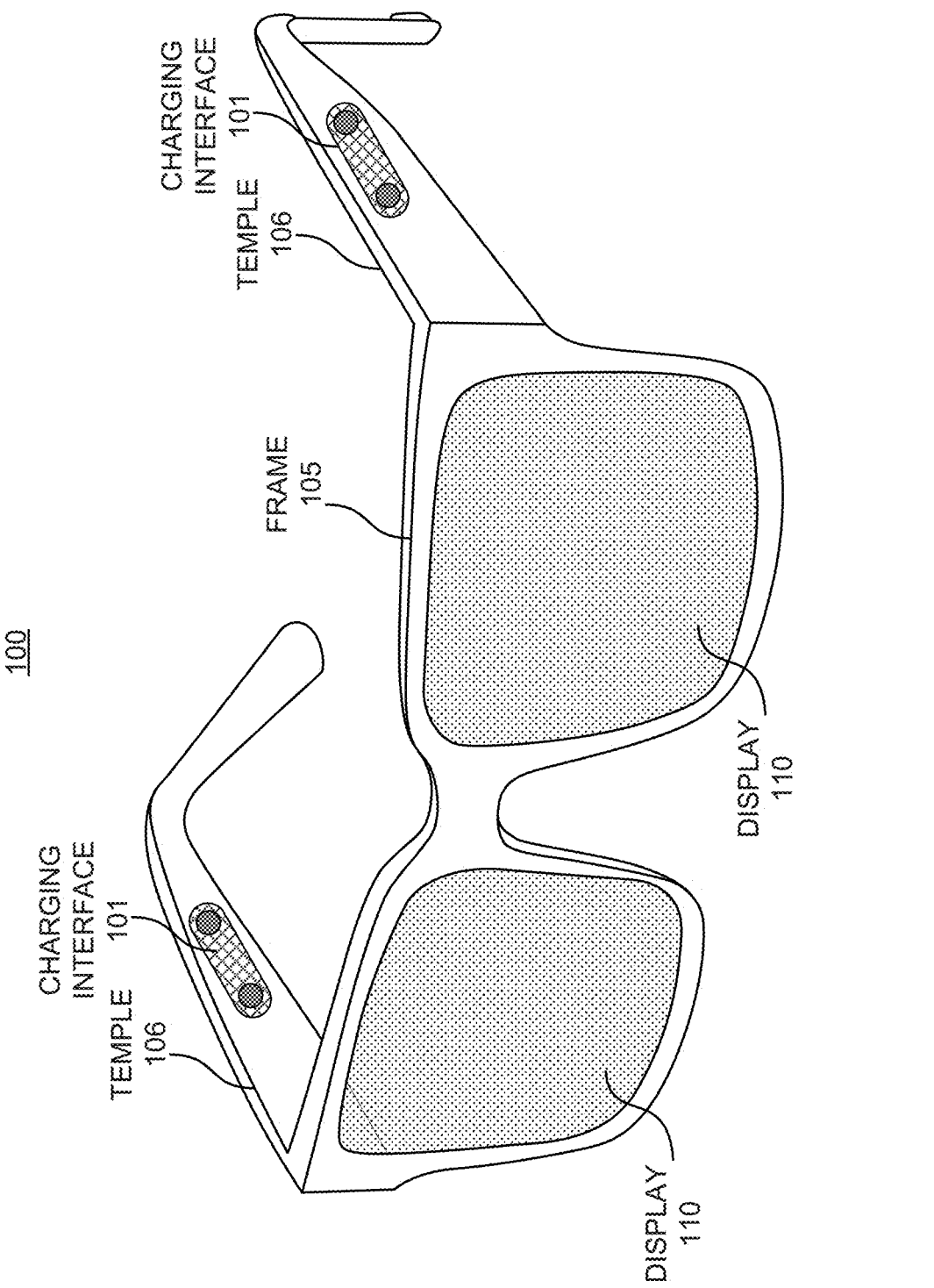
FIG. 1 illustrates a perspective view of a near-eye display in the form of a pair of glasses, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As used herein, a "near-eye display" may refer to any display device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein, a "user" may refer to a user or wearer of a "near-eye display." As used herein, a "wearable device" may refer to any portable electronic device that may be worn on any body part of a user and used to present audio and/or video content, control other devices, monitor bodily functions, and perform similar actions.

Some wearable devices, such as virtual reality (VR), augmented reality (AR), and/or mixed reality (MR) glasses, smartwatches, handheld controllers, and similar ones may employ any number of mechanical components, optical components, and/or electrical components (e.g., sensors, cameras, illuminators, projectors, etc.) to perform their respective functions. As most electrical components need a power source, such display systems may be fitted with one or more batteries. Wired charging of wearable devices may present logistical challenges, as well as, reliability challenges. For example, charging connectors may not allow water-proof or water resistant wearable devices, metallic connections may degrade with use, etc. Wireless charging methods may mitigate reliability concerns but charging efficiency may be a challenge for such interfaces.

In some examples of the present disclosure, a charging system and interface for battery-powered wearable devices are provided. A number of various magnetic core, multi-winding transmitter coil, receiver coil configurations may be used with the transmitter coils generating a charge voltage at the receiver coils through magnetic flux. The receiver coils may be embedded in the wearable devices, and the transmitter coils may be part of a charger. In some examples, a transmitter coil, receiver coil configuration may also be used to charge a battery module to be inserted into a wearable device.

In some examples, bipolar magnets on opposite ends of a transmitter coil module and a receiver coil module may allow magnetic alignment of the coils without any reverse polarity challenge. The transmitter coil, receiver coil configuration may also be used for low-speed data transmission to and from a wearable device while the wearable device is charging. Other benefits and advantages may also be apparent.

FIG. 1 illustrates a perspective view of a near-eye display 100 in the form of a pair of glasses, according to an example. In some examples, the near-eye display 100 may be an implementation of a wearable device, specifically, a head-mounted display (HMD) device configured to operate as a virtual reality (VR) display, an augmented reality (AR) display, and/or a mixed reality (MR) display.

In some examples, the near-eye display 100 may include a frame 105, temples 106, and a display 110. The display 110 may be configured to present media or other content to a user and may include display electronics and/or display optics. For example, the display 110 may include a transparent liquid crystal display (LCD) display panel, a transparent light-emitting diode (LED) display panel, or a transparent optical display panel (e.g., a waveguide display assembly). Other optical components may include waveguides, gratings, lenses, mirrors, etc. Electrical components may include sensors, camera, illuminator(s), etc. In some examples, the temples 106 may include embedded battery(ies) (not shown) to power the electrical components.

In some examples, the various sensors may include any number of depth sensors, motion sensors, position sensors, inertial sensors, and/or ambient light sensors, as shown. In some examples, the various sensors may include any number of image sensors configured to generate image data representing different fields of views in one or more different directions. In some examples, the various sensors may be used as input devices to control or influence the displayed content of the near-eye display 100, and/or to provide an interactive virtual reality (VR), augmented reality (AR), and/or mixed reality (MR) experience to a user of the near-eye display 100. In some examples, the various sensors may also be used for stereoscopic imaging or other similar applications. A virtual reality engine (implemented on the near-eye display 100 or on another computing device and wirelessly coupled to the near-eye display 100) may execute applications within the near-eye display 100 and receive depth information, position information, acceleration information, velocity information, predicted future positions, or any combination thereof of the near-eye display 100 from the various sensors.

In some examples, the near-eye display 100 may further include one or more illuminators to project light into a physical environment. The projected light may be associated with different frequency bands (e.g., visible light, infra-red light, ultra-violet light, etc.), and may serve various purposes. In some examples, the one or more illuminator(s) may be used as locators. Each of the locators may emit light that is detectable by an external imaging device.

This may be useful for the purposes of head tracking or other movement/orientation. It should be appreciated that other elements or components may also be used in addition or in lieu of such locators.

In some examples, the near-eye display 100 may also include a camera or other image capture unit. The camera, for instance, may capture images of the physical environment in the field of view. In some instances, the captured images may be processed, for example, by a virtual reality engine (implemented on the near-eye display 100 or on another computing device and wirelessly coupled to the near-eye display 100) to add virtual objects to the captured images or modify physical objects in the captured images, and the processed images may be displayed to the user by the display 110 for augmented reality (AR) and/or mixed reality (MR) applications.

In some examples, the near-eye display 100 may be implemented in any suitable form-factor, in addition to the pair of glasses shown in the figure, such as a head-mounted display (HMD) or other similar wearable eyewear or device. The near-eye display 100 may also include (not shown) one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking system(s) may capture reflected radio waves emitted by a miniature radar unit. These data associated with the eye may be used to determine or predict eye position, orientation, movement, location, and/or gaze.

As described herein, the near-eye display 100 may include one or more batteries to supply power to any electrical components. A charging interface 101 may be provided to charge the one or more batteries. In some examples, the battery(ies) may be incorporated into a body of one or both temples 106 and the charging interface 101 may be a connector or wireless charging at a location on one or both of the temples 106. Wired charging may be more efficient than wireless charging, however, a connector with metal parts may render the near-eye display 100 susceptible to environmental conditions such as water. Furthermore, degradation of the connector parts through wear-and-tear may reduce a life expectancy of the near-eye display 100. Wireless charging, on the other hand, may allow complete insulation of the near-eye display 100, and thereby, reduce environmental susceptibility and wear-and-tear related reliability concerns. Wireless charging interface 101 may be positioned in various locations on an inside or outside surface of the temples 106 to allow different charging configurations.

Functions described herein may be distributed among components of the near-eye display 100 in a different manner than is described here. Furthermore, a near-eye display as discussed herein may be implemented with additional or fewer components than shown in FIG. 1.

Figure 2A:
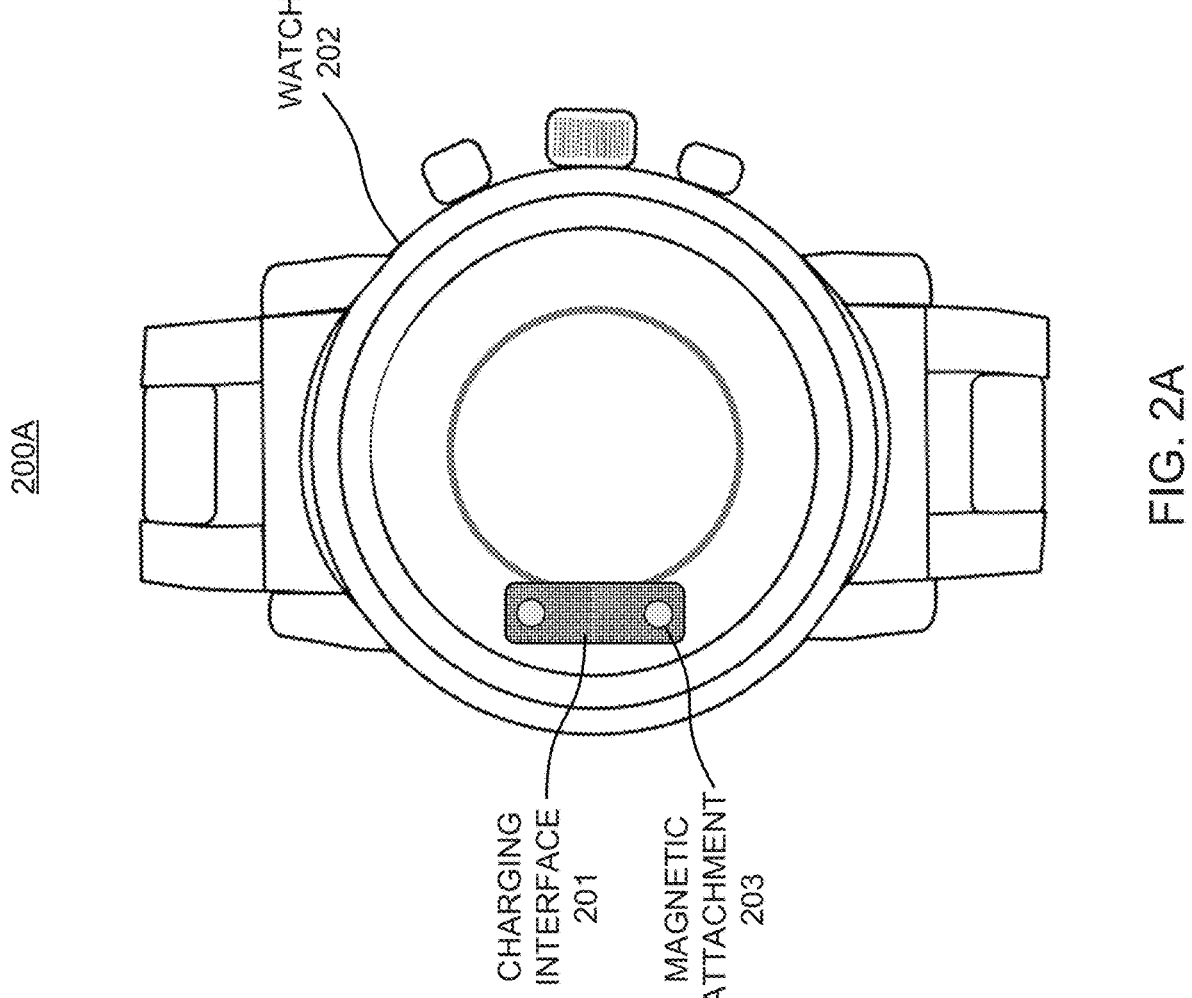
FIG. 2A-2C illustrate various wearable devices with wireless charging interfaces, according to examples.
Figure 2B:
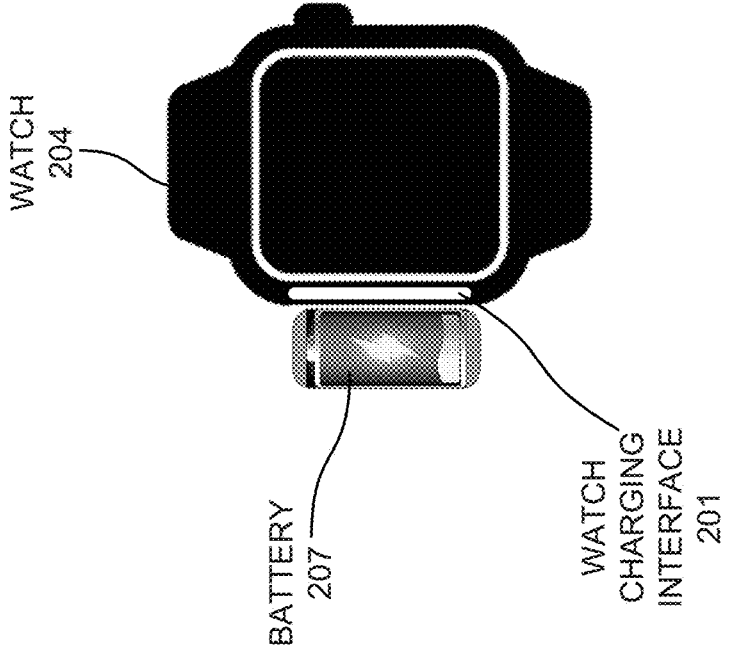
Figure 2B:
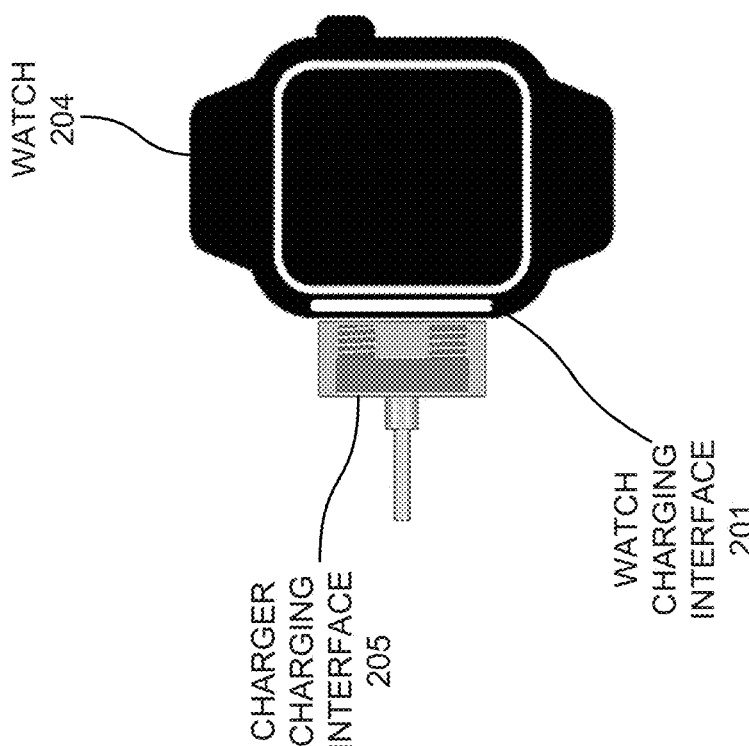
Figure 2C:
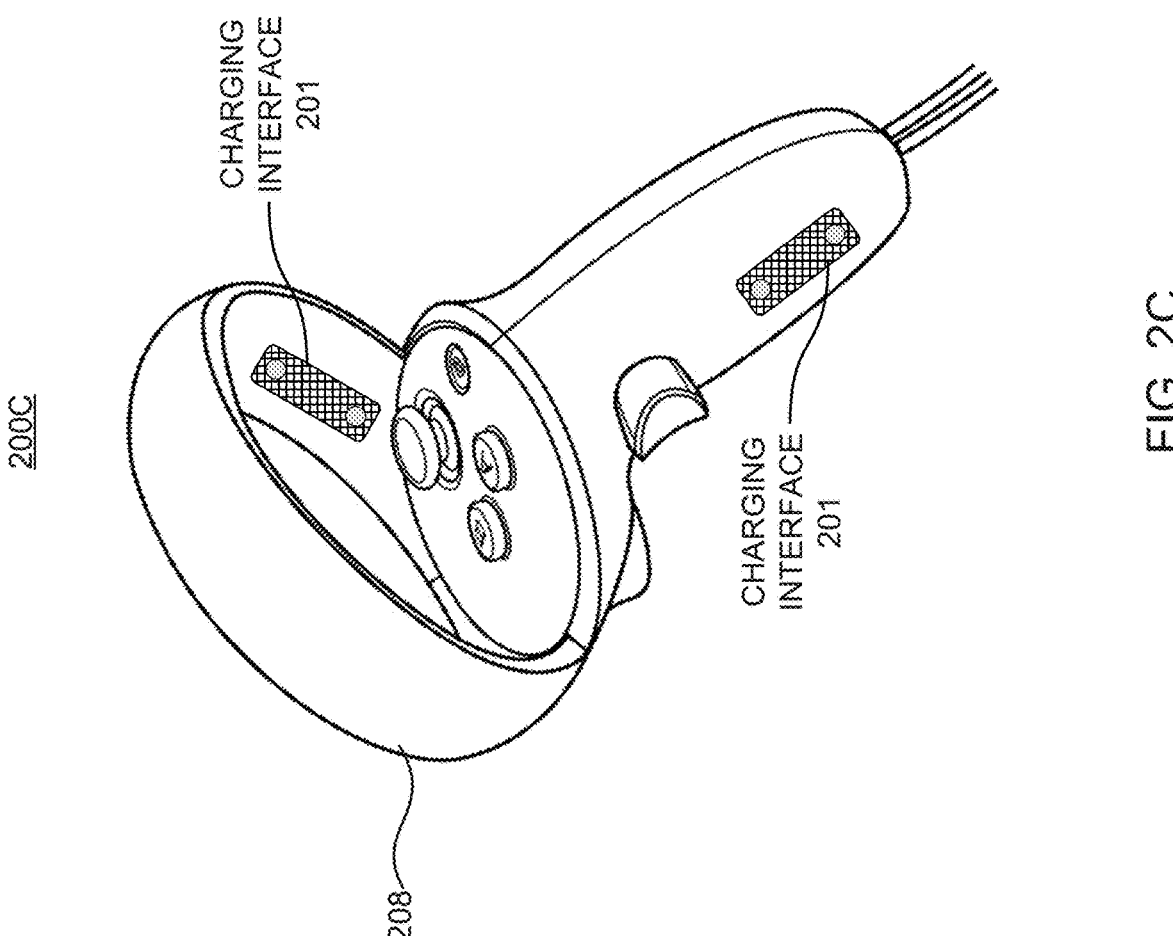

FIG. 2A-2C illustrate various wearable devices with wireless charging interfaces, according to examples. Diagram 200A in FIG. 2A shows a smartwatch 202, where one or more batteries may be embedded in a body or band of the smartwatch 202. The smartwatch 202 may present audio, visual, or other content to a user, enable communication, monitor bodily functions, and perform other functions. A wireless charging interface 201 with magnetic attachments 203 on a bottom surface of the smartwatch 202 may be used for attachment of a charger interface and receive charging voltage through magnetic induction from the charger.

Diagram 200B in FIG. 2B shows two charging configurations for a smartwatch 204. In a first configuration, a charger charging interface 205 may include a transmitter coil and attach through magnetic attachment to a wireless charging interface 201 of the smartwatch 204 on a side surface of the watch. A receiver coil in the charging interface 201 of the smartwatch 204 may receive charging voltage from the charger charging interface 205 via magnetic induction. In a second configuration, a battery 207 with wireless charging capability (i.e., transmitter coil and suitable charging circuitry) may be used to charge the smartwatch 204 through the same charging interface 201.

Diagram 200C in FIG. 2C shows a handheld controller 208, where one or more batteries may be embedded in a body or handle of the handheld controller 208. The handheld controller 208 may be used to provide input and control functions of a game console, a virtual reality (VR), augmented reality (AR), and/or mixed reality (MR) display system, and other controllable electronic equipment. A wireless charging interface 201 on an inside or outside surface of the body or an outside surface of the handle of the handheld controller 208 may be used to charge the battery(ies). As with the glasses and smartwatch, the charging interface 201 may be used to receive charging voltage via magnetic induction from a charger or a wirelessly charging capable battery.

FIGS. 3A-3H illustrate various transmitter and receiver coil configurations for wirelessly charging wearable devices individually or in pairs, according to examples. As discussed herein, wireless charging of wearable devices may be accomplished through magnetic induction between a transmitter coil of a charger or charging battery and a receiver coil of the wearable device.

Figure 3A:
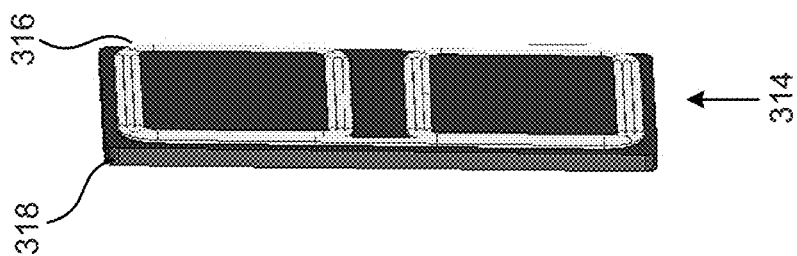
FIGS. 3A-3H illustrate various transmitter and receiver coil configurations for wirelessly charging wearable devices individually or in pairs, according to examples.
Figure 3A:
Figure 3A:
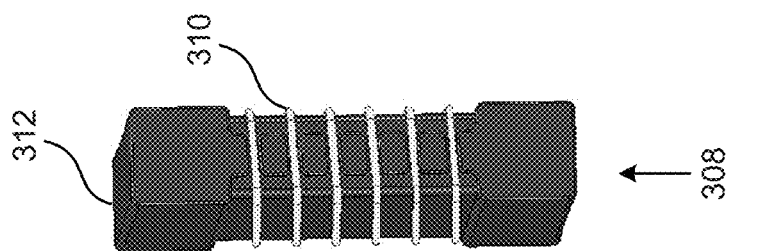
Figure 3A:
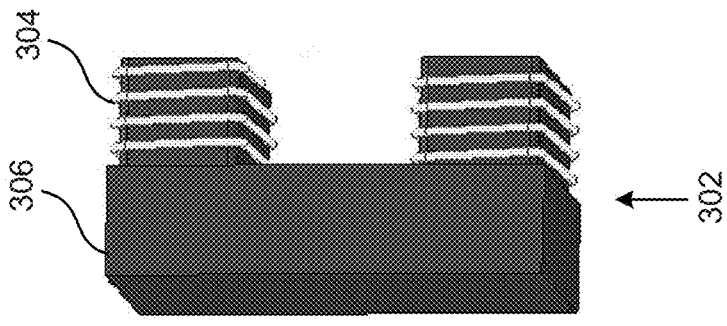

Diagram 300A in FIG. 3A illustrates various example transmitter coil configurations for wirelessly charging wearable devices including a dual-helical transmitter coil 302 with its two helical coils 304 and substantially bracket-shaped core 306, a single-helical transmitter coil 308 with its single coil 310 and substantially linear shaped core 312, and a flat transmitter coil 314 with its dual, flat-spiral coils 316 and backplate 318.

In some examples, the use of dual (helical or spiral) coils, as in the dual-helical transmitter coil 302 and the flat transmitter coil 314 may allow a stronger magnetic field to be induced along one dimension (along an axis of the coils), but not necessarily along other (e.g., orthogonal) dimensions. Thus, these transmitted coil configurations may provide higher efficiency charging but may be limited in uni-directionality. On the other hand, the single-helical transmitter coil 308 may allow charging with a similar receiver coil in any direction around the coil 310, albeit with a potentially weaker magnetic field.

The cores 306, 312, and the backplate 318 in the transmitter coils of diagram 300A may include ferro-magnetic material, which may increase an intensity of the generated magnetic fields providing a larger charging distance or higher charge voltage generated on the receiver side. In a magnetic coil, a generated voltage, V(t), may be a function of current, I(t), flowing through the coil and an inductance, L, of the coil, which may be represented by the following expression/equation:

$$V(t) = L\frac{dI}{dt} \tag{1}$$

The inductance, L, of the coil may be represented by the following expression/equation:

$$L = \mu_0 * \mu_r * l \left[ \ln\left(\frac{2l}{r}\right) - 0.75 \right], \tag{2}$$

where $\mu_0$ is permeability of free space, $\mu_r$ is permeability of the core material, l is a length of the coil windings, and r is a radius of the coil windings. Thus, the transmitter coil may generate a charging voltage for the wearable device via magnetic induction with the receiver coil. A strength of the generated magnetic field (thereby the generated charging voltage) may be adjusted by selecting a length, a radius, and/or a type of core material for the magnetic core. Example core materials may include ferromagnetic materials such as iron, cobalt, nickel, and alloys thereof.

In some examples, a larger and/or longer coil or a more efficient core material may be selected for more efficient charging. For example, a larger transmitter coil may be used in a charging station or a charging-capable case with sufficient space.

Figure 3B:
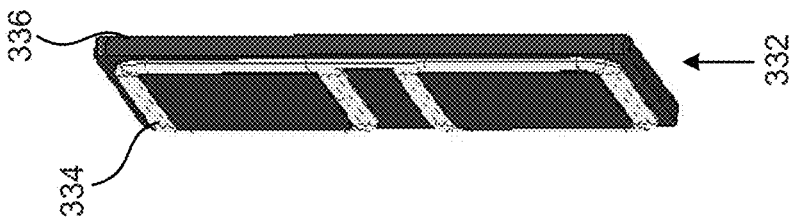
Figure 3B:
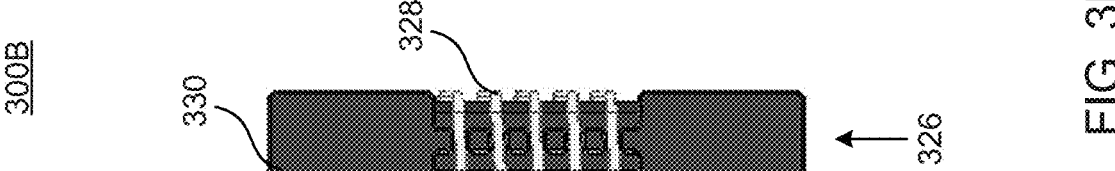
Figure 3B:
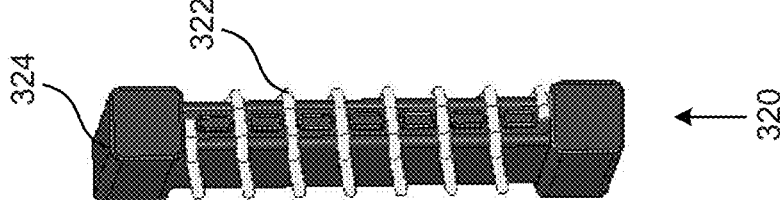

Diagram 300B in FIG. 3B illustrates various example receiver coil configurations for wirelessly charging wearable devices including a first single-helical receiver coil 320 with its helical coil 322 and substantially linear shaped core 324, a second single-helical receiver coil 326 with its helical coil 328 and substantially linear shaped core 330, and a flat receiver coil 332 with its dual, flat-spiral coils 334 and backplate 336. In some examples, the first single-helical receiver coil 320 and the second single-helical receiver coil 326 may operate similar to the single-helical transmitter coil 308 with a difference between the two being a more condensed coil structure and larger core in the second single-helical receiver coil 326. The flat receiver coil 332 may also function similar to the flat transmitter coil 314.

In some examples, the receiver coils may be placed in suitable places inside the wearable devices such as temples of the augmented reality (AR) glasses, a frame of the smartwatch, a handle of the handheld controller, etc. Thus, by being integrated completely inside a wearable device, a receiver coil may allow the wearable device to be water-proof or water-resistant. The wearable devices may be subject to weight and/or size limitations. Thus, smaller receiver coils may be used in the wearable devices (compared to the transmitter coils), but lighter weight, higher permeability (e.g., ferrimagnetic ceramics) may be used as core material to enhance the overall charging efficiency.

In some examples, the transmitter coils shown in diagram 300A may be enclosed by an insulating case at the end of a charging cable. In other examples, the transmitter coils may be incorporated into a charging device such as a charging station, a charging-capable case (for glasses or smartwatch), etc. Furthermore, the configurations shown in diagrams 300A and 300B are for illustration purposes. Other configurations with fewer or additional coils, various core structures, and various coil types and sizes may also be implemented using the principles described herein.

Figure 3C:
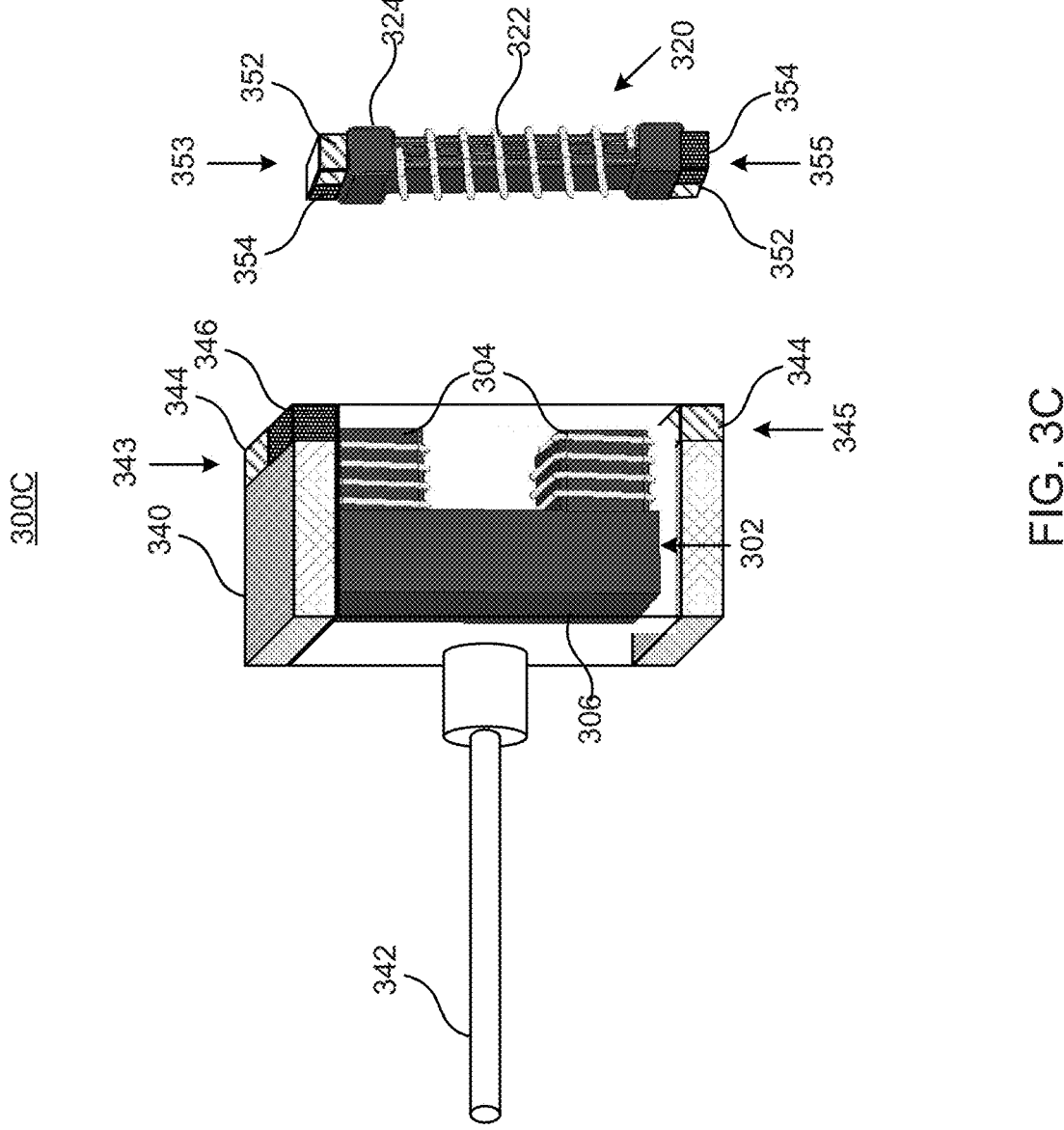

Diagram 300C in FIG. 3C illustrates a transmitter coil, receiver coil pair for wirelessly charging wearable devices including dual-helical transmitter coil 302 with its dual coils 304 and substantially bracket-shaped core 306 inside enclosure 340. The enclosure 340 may be an overmolding or similar enclosure in some examples. Cable 342 may provide the charging voltage (for inducing the magnetic field through the dual-helical transmitter coil 302). The enclosure 340 may include a top magnet 343 with north pole 344 and south pole 346 and a bottom magnet 345 with the north pole 344 and the south pole 346 in reversed position. Diagram 300C also shows the first single-helical receiver coil 320 with its single coil 322 and substantially linear shaped core 324. Another top magnet 353 with north pole 352 and south pole 354 and another bottom magnet 355 with reversed position north pole 352 and south pole 354 are positioned on top and at the bottom of the first single-helical receiver coil 320.

In some examples, each of the magnets may be considered to have a polarity axis from a north pole to a south pole of the magnet. Thus, two magnets (e.g., top magnet 343 and bottom magnet 345) may be considered to have their respective polarity axes reversed when they are positioned as shown in the diagram (with respective north and south poles in opposite positions). Furthermore, the polarity axes of the top magnet 343 and the bottom magnet 345 may be considered aligned with a surface of the enclosure 340 facing the first single-helical receiver coil 320. Reversed polarity axes of the respective top magnets and bottom magnets of the transmitter coil and the receiver coil may allow the transmitter coil and the receiver coil to be aligned and attracted with the help of the magnets regardless of an orientation of either coil. Thus, no reverse polarity issues may arise. Because the magnetic field induced charging voltage does not depend on respective orientations of the transmitter and receiver coils, the attachment may not need a polarity. Therefore, the magnets may allow attachment without polarity of the connectors, and the connectors may attract each other regardless of their respective orientations.

In some examples, charging efficiency may be further increased by providing shielding material on an outside surface (or on the inside surface, but underneath the transmitter coil) in the enclosure. This may allow the generated magnetic field to be focused on the receiver coil.

Figure 3D:
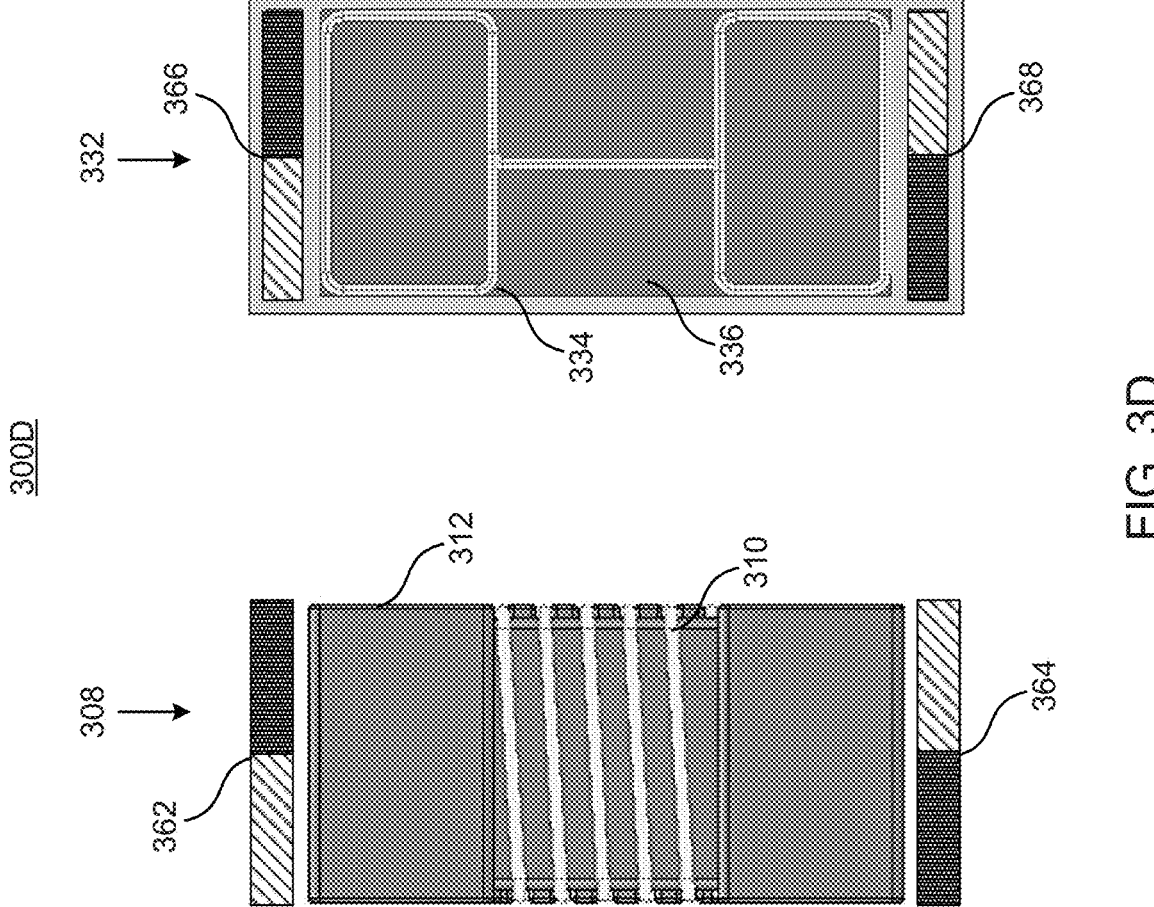

Diagram 300D in FIG. 3D illustrates two example coil configurations with magnetic alignment for wirelessly charging wearable devices including the single-helical transmitter coil 308 with its coil 310 and core 312, and the flat receiver coil 332 with its dual, flat-spiral coils 334 and backplate 336. The single-helical transmitter coil 308 also includes top magnet 362 and bottom magnet 364 with respective polarity axes reversed. The flat receiver coil 332 also includes top magnet 366 and bottom magnet 368 with respective polarity axes reversed.

In some examples, the respective poles of the top magnet 362 of the single-helical transmitter coil 308 and the top magnet 366 of the flat receiver coil 332 may have their respective polarity axes reversed to ensure automatic alignment (and attraction) when the single-helical transmitter coil 308 and the flat receiver coil 332 are used as a charging coil pair together.

Figure 3E:
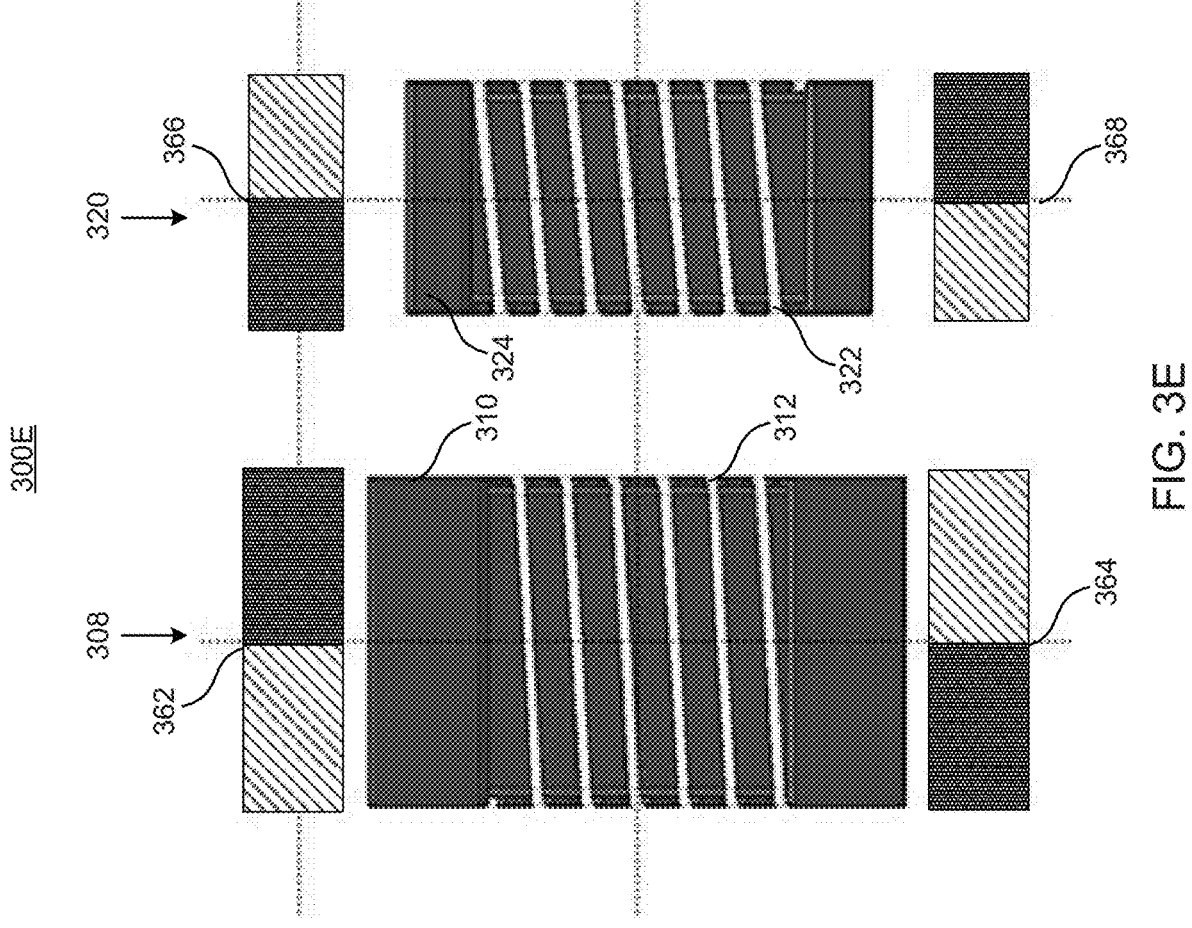

Diagram 300E in FIG. 3E illustrates two other example coil configurations with magnetic alignment for wirelessly charging wearable devices including the single-helical transmitter coil 308 with its coil 310 and core 312, and the single-helical receiver coil 320 with coil 322 and core 324. The single-helical transmitter coil 308 also includes top magnet 362 and bottom magnet 364 with respective polarity axes reversed. The single-helical receiver coil 320 also includes top magnet 366 and bottom magnet 368 with respective polarity axes reversed.

Figure 3F:
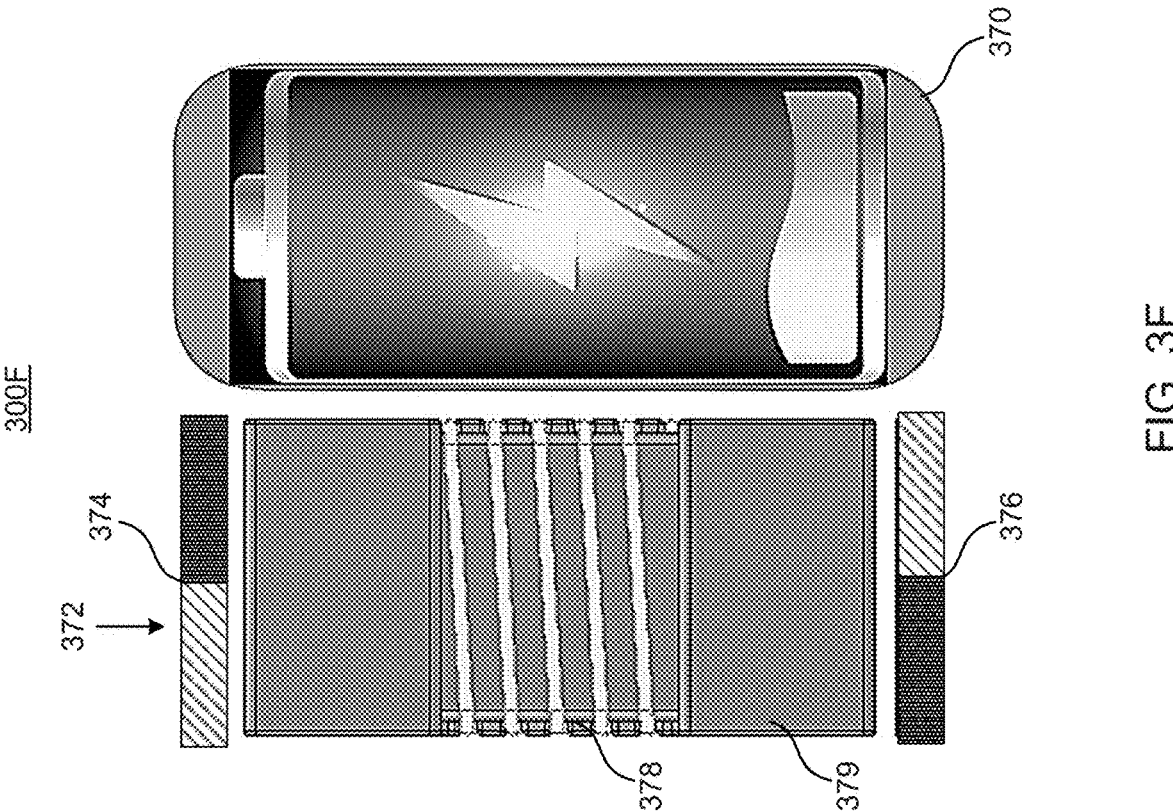

In diagram 300E, a front view of the single-helical transmitter coil 308 and a back view of the single-helical receiver coil 320 are shown side-by-side. Thus, when the single-helical transmitter coil 308 and the single-helical receiver coil 320 are brought close to each other, the opposing poles (south and north) of the respective top magnets and the bottom magnets may line up and attract each other. The reverse-polarized top and bottom magnets may not only attract each other and provide retention but may also align the respective coils. The configuration in diagram 300E also depicts how transmitter and receiver coils may be magnetically aligned and retained together even if the coil sizes are different Diagram 300F in FIG. 3F illustrates a coil configuration that may be used as transmitter and receiver in a battery module for wirelessly charging a battery that may be incorporated into wearable devices including a front view of the battery module 370 and a back view of the battery module 370 including a charging coil configuration 372 with coil 378, core 379, top magnet 374, and bottom magnet 376.

The battery module 370 may be a replaceable battery module or an external battery module, which may be charged outside of a wearable device, then inserted into the wearable device or charge an internal battery of the wearable device through wireless charging. For example, the battery module may be a generic extra battery that may be used with more than one type of wearable device.

In some examples, the battery module 370 may be coupled with a transmitter coil of a wireless charger (through alignment of the top and bottom magnets with top or bottom magnets of the transmitter coil) and be charged while the battery module 370 is disconnected from a wearable device. Subsequently, the charged battery module 370 may be connected to (e.g., inserted into or aligned with an internal receiver coil of) a wearable device and provide power or charge the device's internal battery. Thus, the charging coil configuration 372 may be used as a transmitter coil and a receiver coil in different scenarios.

Figure 3H:
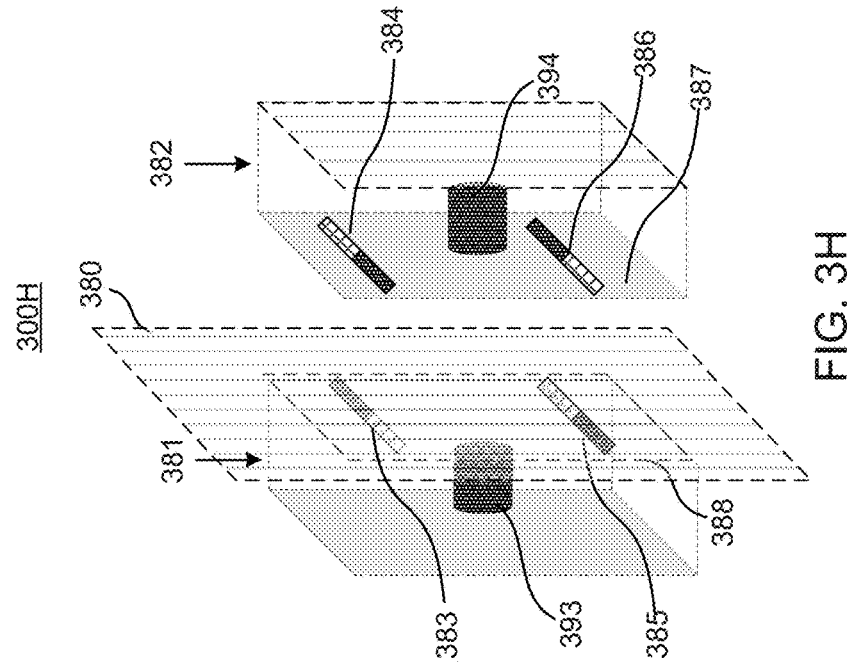
Figure 3G:
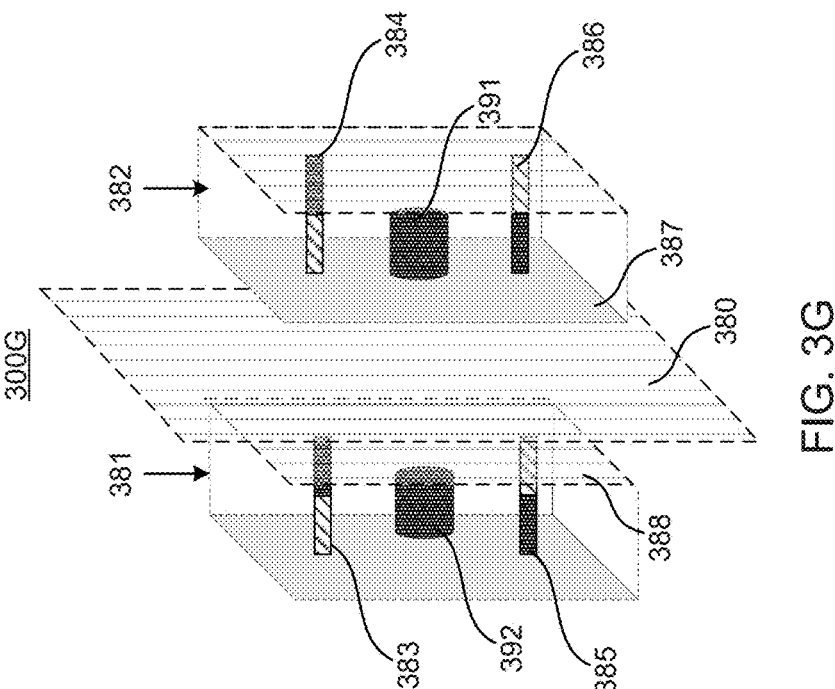

Diagrams 300G and 300H in FIGS. 3G-3H illustrate magnetic alignment and attachment of two devices (e.g., a wearable device and a charging device) via two pairs of magnets. Diagram 300G in FIG. 3G shows a wireless charging interface with a charging device 381 and receiving device 382 (e.g., a wearable device). The charging device 381 may include a charging transmitter 392 (e.g., any of the transmitter coils described herein or other wireless charging systems), top magnet 383, and bottom magnet 385. As shown in the diagram 300G, the top and bottom magnets 383 and 385 are arranged such that their respective polarity axes are orthogonal to an attachment surface 388 of the charging device 381. In a charging operation, the attachment surface 388 of the charging device 381 and an attachment surface 387 of the receiving device 382 may come in contact or be in close proximity to allow wireless charging via magnetic induction between the two devices. The receiving device 382 may also have top magnet 384 and bottom magnet 386 with their respective polarity axes orthogonal to the attachment surface 387.

In some examples, an attachment plane 380 may be defined as a virtual plane between the attachment surfaces 387 and 388 to reference polarity axes of the magnets. A polarity axis of a magnet being "aligned" with the attachment plane 380 means a position of the magnet with regard to its north-south pole orientation is in parallel with the attachment plane 380 (as opposed to the magnet being orthogonally positioned with regard to the attachment plane 380). It should be appreciated that a polarity axis of a magnet also has a direction (from north pole toward the south pole). Thus, when two polarity axes are reversed, the associated magnets are positioned such that a north pole of the first magnet corresponds to the south pole of the second magnet and vice versa.

In some examples, respective orientations of the charging device 381 and the receiving device 382 may play a role in successful charging operation. For example, the charging transmitter 392 and the charging receiver 391 may include systems that can only charge if the two modules are aligned in a particular orientation and not in other orientations. Thus, the arrangement of the magnets may ensure that the charging device 381 and the receiving device 382 may only attach is the two devices are arranged as shown. For example, in a reverse orientation, where top magnet 384 may be aligned with bottom magnet 385, the two magnets may repel each other due to their polarity axes and prevent attachment of the two devices.

Diagram 300H in FIG. 3H shows another charging interface configuration, where differently from the configuration in diagram 300G, top and bottom magnets 383 and 385 in the charging device 381 are arranged such that their respective polarity axes may be aligned (in parallel) with the attachment plane 380. Similarly, top and bottom magnets 384 and 386 in the receiving device 382 are arranged such that their respective polarity axes may be aligned (in parallel) with the attachment plane 380. The polarity axes of the top magnets 383 and 384 of the charging device 381 and receiving device 382 may be reversed with respect to each other, as are the polarity axes of the bottom magnets 385 and 386 of the charging device 381 and receiving device 382. This reverse orientation of the polarity axes along with the alignment of the polarity axes with the attachment plane 380 may allow attachment of the charging device 381 and receiving device 382 independent of their orientation with respect to each other.

In some examples, transmitter coils and receiver coils as described herein may be used as charging transmitter 392 and charging receiver 391. As the magnetic field induction based charging between such interfaces may not depend on an orientation of either charging interface, the arrangement of the magnets as shown in diagram 300H may allow automatic alignment and attachment of the charging device and receiving device in either orientation.

In some examples, the top and bottom magnets may be affixed to top and bottom surfaces of respective transmitter and receiver coils. In other examples, the magnets may be affixed in proximity of the transmitter and receiver coils such as a location inside respective device (enclosure) or embedded into respective enclosures at the attachment surfaces.

Figure 4:
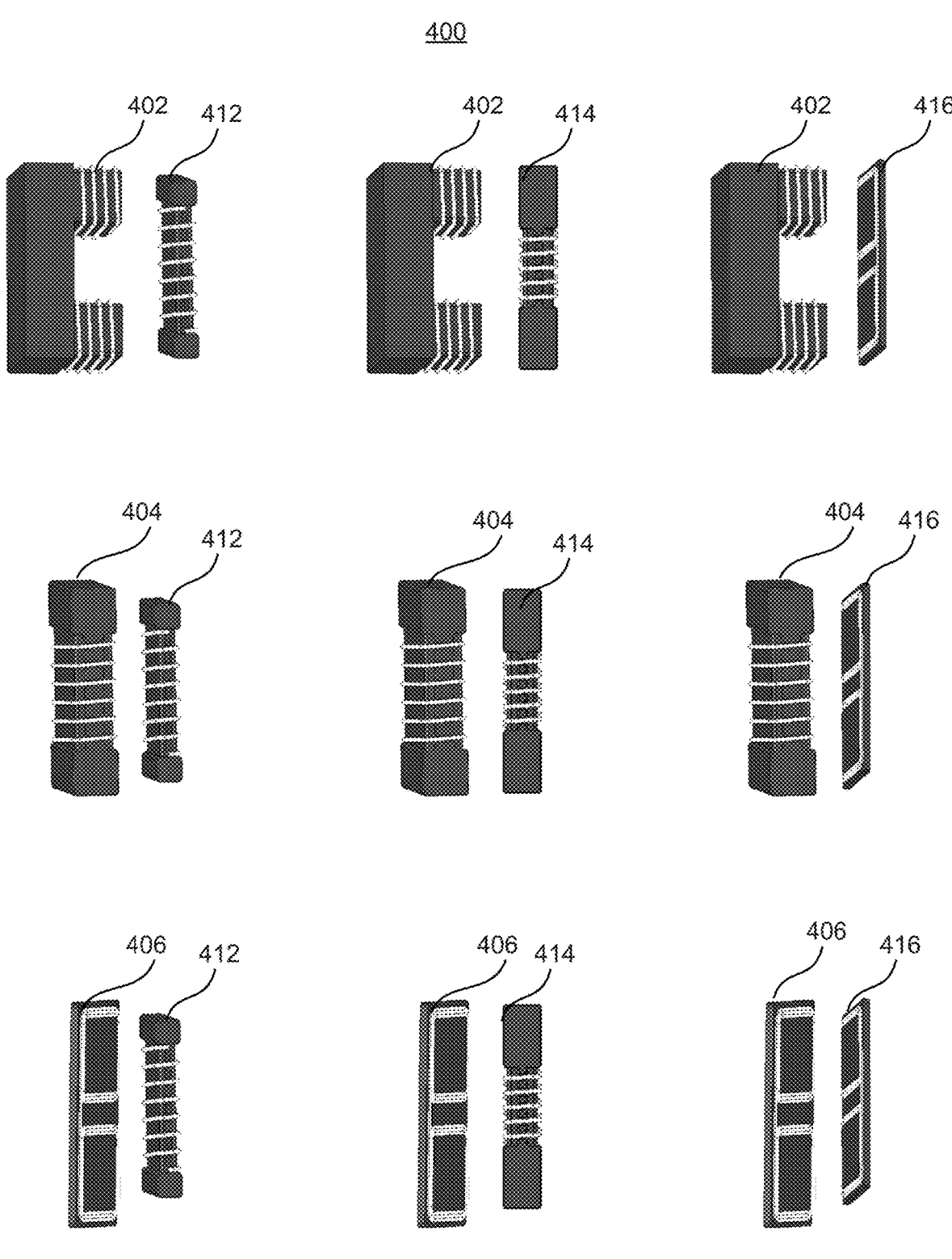
FIG. 4 illustrates various transmitter and receiver coil pair configurations, according to examples.

FIG. 4 illustrates various transmitter and receiver coil pair configurations, according to examples. Example transmitter and receiver coil pair configurations in diagram 400 include, but are not limited to, the dual-helical transmitter coil 402 paired with the first single-helical receiver coil 412, the dual-helical transmitter coil 402 paired with the second single-helical receiver coil 414, the dual-helical transmitter coil 402 paired with the flat receiver coil 416, the single-helical transmitter coil 404 paired with the first single-helical receiver coil 412, the single-helical transmitter coil 404 paired with the second single-helical receiver coil 414, the single-helical transmitter coil 404 paired with the flat receiver coil 416, the flat transmitter coil 406 paired with the first single-helical receiver coil 412, the flat transmitter coil 406 paired with the second single-helical receiver coil 414, and the flat transmitter coil 406 paired with flat receiver coil 416.

In some examples, a suitable transmitter coil may be selected based, at least in part, on a type and/or size of the charging device. For example, a charging cable with a charging enclosure at one end may utilize the dual-helical transmitter coil 402. A charging case with relatively thin walls may utilize the flat transmitter coil 406. As shown in the diagram, various transmitter coils may be paired with different receiver coils. The receiver coils may also be selected based, at least in part, on a type and size of the wearable device. For example, the first helical receiver coil 412 or the second helical receiver coil 414 may be used in augmented reality glasses or a handheld controller. The flat receiver coil 416 may be used in a smartwatch.

While specific transmitter and receiver coil types are shown and discussed herein, the types shown are for illustration purposed. Other types and configurations of transmitter or receiver coils with fewer or additional coils, different sizes or shapes of cores, etc. may also be implemented using the principles described herein. For example, the dual-helical transmitter coil 402 may also be used as a receiver coil, while either of the first single-helical receiver coil 412 or the second single-helical receiver coil 414 may be used as transmitter coils too.

Figure 5A:
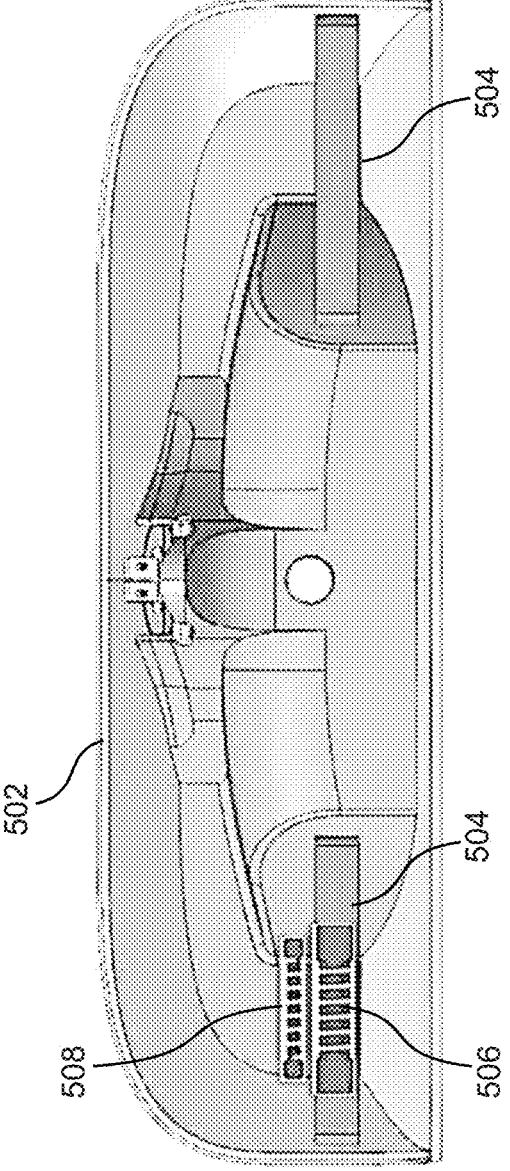
FIGS. 5A-5B illustrate views of a charging case for a near-eye display device with transmitter and receiver charging coils for various temple folding configurations, according to examples.
Figure 5B:
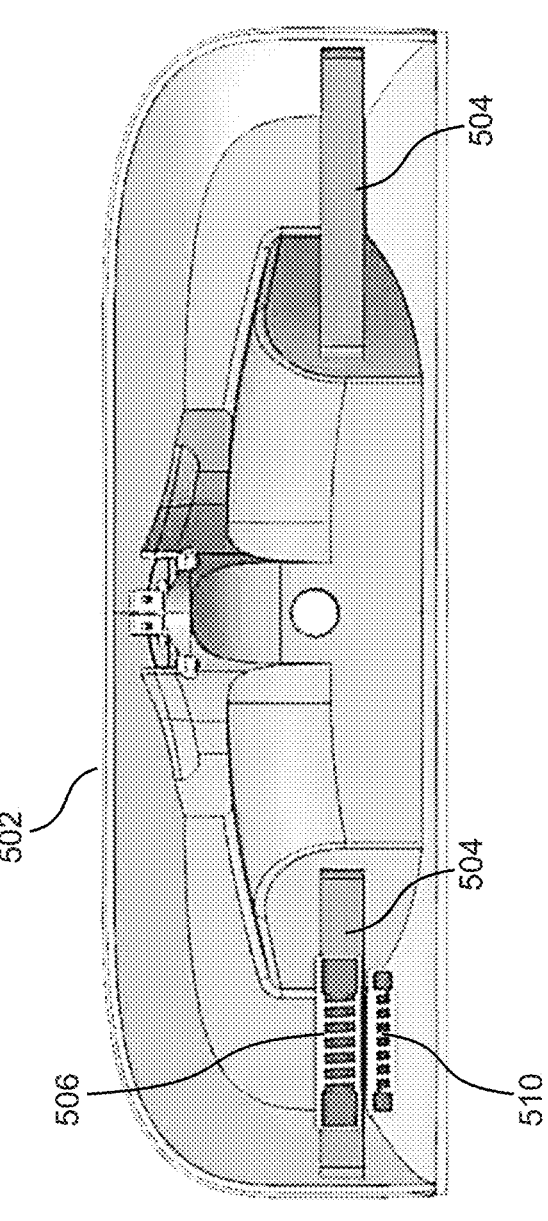

FIGS. 5A-5B illustrate views of a charging case for a near-eye display device with transmitter and receiver charging coils for various temple folding configurations, according to examples. Diagram 500A in FIG. 5A shows a near-eye display device charging-capable case 502. The near-eye display device may have one or more batteries to operate any electrical components. To charge the battery(ies), the near-eye display device may include a helical receiver coil 508 embedded into a tip portion of one of the temples. A single-helical transmitter coil 506 may be embedded in a location 504 of the charging-capable case 502, where the tip portion of the temple rests when the near-eye display device are placed in the charging-capable case 502. The charging-capable case 502 may be connected to a power supply such that the single-helical transmitter coil 506 generates a charging voltage in the helical receiver coil 508 through magnetic induction. The location 504 may, for example, be a protrusion within the case to support the near-eye display device and separate temples when the near-eye display device is placed inside the case.

Diagram 500B in FIG. 5B shows a different resting configuration of the near-eye display device inside the charging-capable case 502, where a temple, and thereby the embedded receiver coil 510 are on an opposite side of the single-helical transmitter coil 506 in a resting state. Because the single-helical transmitter coil 506 is direction-agnostic relative to its core axis, charging voltage may be induced in the receiver coil 510 regardless of the position of the receiver coil relative to the single-helical transmitter coil 506. Thus, the near-eye display device may be charged with same efficiency regardless of whether the temples are placed on one side or the other side of the location 504 (protrusion) inside the charging-capable case 502. In some examples, the wireless charging interface of the pair of charging coils may also be used to exchange data at low speeds (e.g., up to 864 kbps).

Figure 5C:
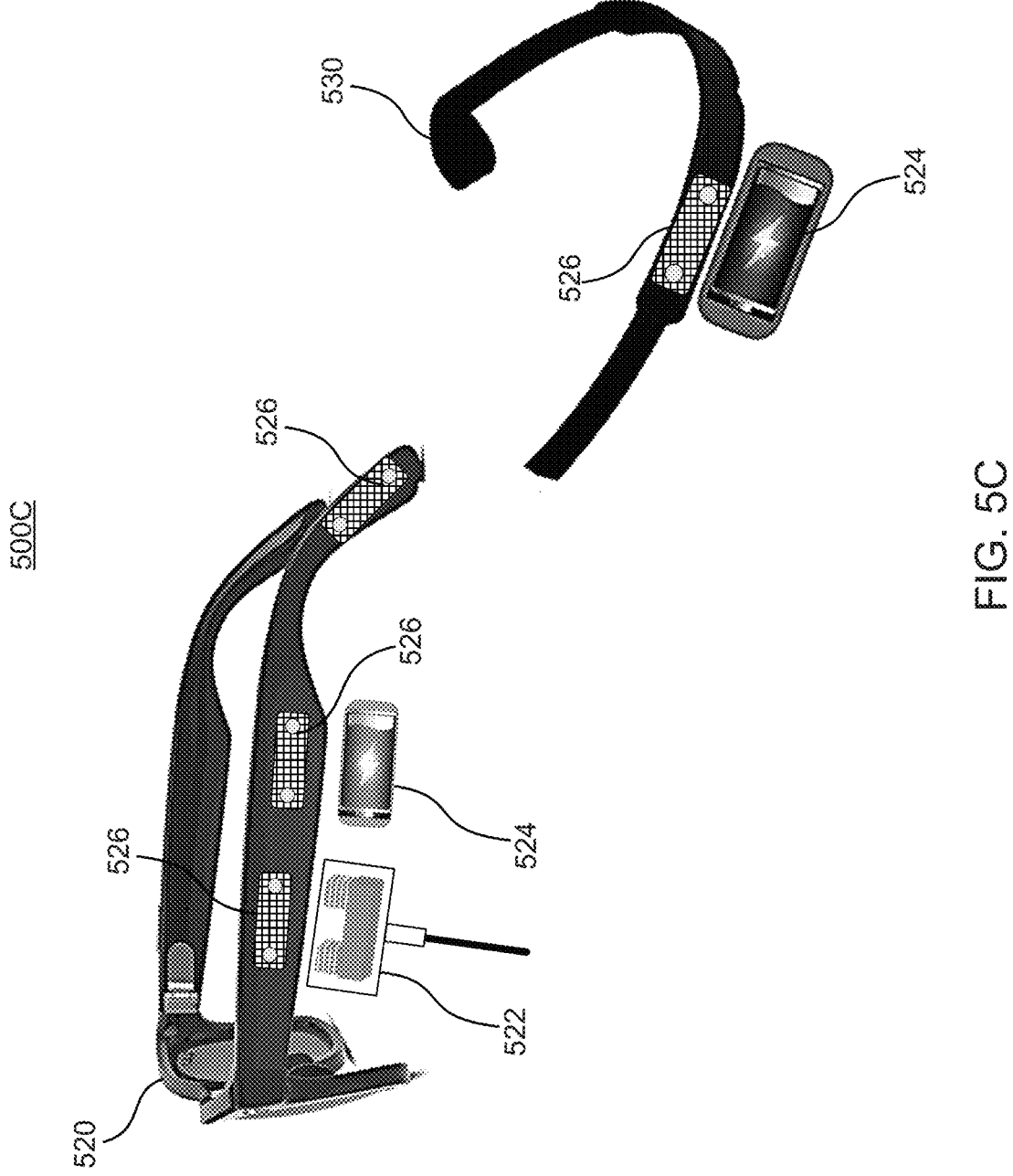
FIG. 5C illustrates charging configurations for a near-eye display device including a lanyard, according to examples.

Diagram 500C in FIG. 5C shows augmented reality (AR) glasses 520 (example implementation of a near-eye display device) with integrated battery(ies), which may be charged through wireless charging by a lanyard 530. The lanyard 530 may be a cord, a length of webbing, or a strap that may be attached to a pair of glasses, a camera, a handheld controller, or similar items and utilized to restrain, retrieve, activate, or deactivate. As discussed herein, the augmented reality (AR) glasses 520 may include wireless charging interface 526 at various locations on its temples for charging of embedded batteries by a charger interface 522 or a wireless charging capable battery 524. The lanyard 530 may, for example, also include a charging interface 526 to receive charging voltage from a charger or wireless charging capable battery 524. The lanyard may have an electrical connection at one or more of its tips to the augmented reality (AR) glasses 520. Thus, when the lanyard is connected to the augmented reality (AR) glasses 520, the charging interface 526 on the lanyard 520 may also be used to charge battery(ies) of the augmented reality (AR) glasses 520.

Figure 5D:
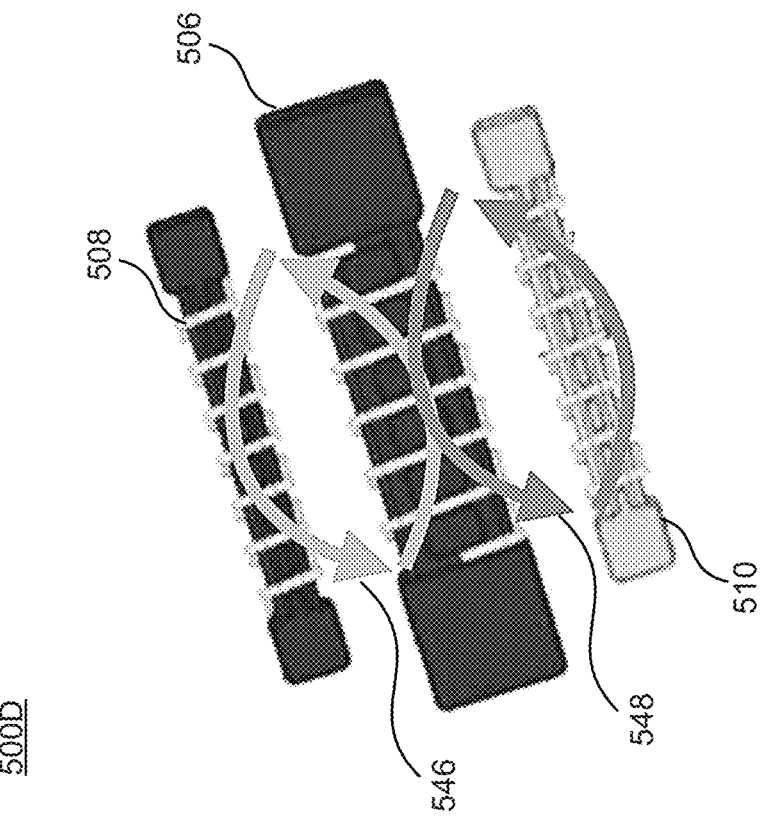
FIG. 5D illustrates magnetic induction between a transmitter coil and two receiver coils in wireless charging, according to an example.
Figure 5D:
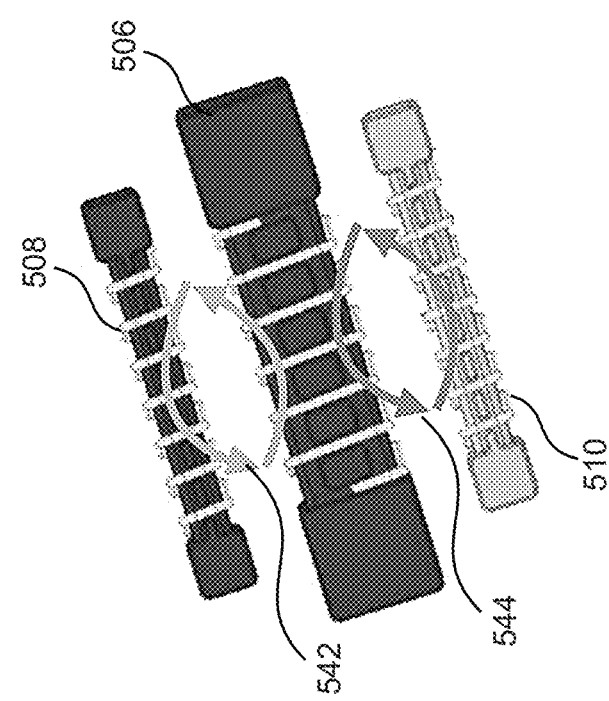

FIG. 5D illustrates magnetic induction between a transmitter coil and two receiver coils in wireless charging, according to an example. Diagram 500D in FIG. 5D shows how a transmitter coil 506 may charge receiver coils 508 and 510 when the receiver coils are placed on either side of the transmitter coil 506 through respective magnetic inductions 542 and 544. Diagram 500D also shows how the magnetic induction (546, 548) may be increased when a distance between the transmitter coil 506 and the receiver coils 508, 510 is decreased. Thus, a charging-capable case, a charger, or other charging devices and the wearable device may be designed to minimize a distance between the transmitter coil 506 and the receiver coils 508, 510.

As discussed herein, a charging system and interface for battery-powered wearable devices may include a number of various magnetic core, multi-winding transmitter coil, receiver coil configurations to generate a charge voltage at a wearable device. A transmitter coil, receiver coil configuration may also be used to charge a battery module to be inserted into or attached to a wearable device. In some examples, bipolar magnets on opposite ends of a transmitter coil module and a receiver coil module may allow magnetic alignment of the coils without any reverse polarity challenge. The transmitter coil, receiver coil configuration may also be used for low-speed data transmission to and from a wearable device while the wearable device is charging.

According to examples, a charging interface for a wearable device may include a receiver coil arranged inside the wearable device; a transmitter coil arranged outside the wearable device, where the transmitter coil is to generate a charging voltage for the wearable device via magnetic induction with the receiver coil; a first magnet having a first polarity axis and positioned at a top portion of the transmitter coil, and a second magnet having a second polarity axis and positioned at a bottom portion of the transmitter coil; and a third magnet having a third polarity axis and positioned at a top portion of the receiver coil, and a fourth magnet having a fourth polarity axis and positioned at a bottom portion of the receiver coil. The first polarity axis, the second polarity axis, the third polarity axis, and the fourth polarity axis associated with the first magnet, the second magnet, the third magnet, and the fourth magnet, respectively, may be aligned with an attachment plane between the transmitter coil and the receiver coil. The first polarity axis and the third polarity axis may be reversed with respect to each other. The second polarity axis and the fourth polarity axis may be reversed with respect each other.

According to examples, the transmitter coil may include at least one of two helical coils arranged with parallel longitudinal axes; a single helical coil; or two flat spiral coils arranged side-by-side in a coil plane. The transmitter coil may further include at least one of a bracket-shaped ferromagnetic core inside the two helical coils; a ferromagnetic core inside the single helical coil; or a ferromagnetic backplate attached to the two flat spiral coils. The receiver coil may include at least one of two helical coils arranged with parallel longitudinal axes; a single helical coil; or two flat spiral coils arranged side-by-side in a coil plane. The receiver coil may further include at least one of a bracket-shaped ferromagnetic core inside the two helical coils; a ferromagnetic core inside the single helical coil; or a ferromagnetic backplate attached to the two flat spiral coils. The transmitter coil may be arranged inside an enclosure at one end of a charging cable; a charging-capable case for the wearable device; or a charging station. The receiver coil may be attached to a battery module and may charge the battery module when the battery module is disconnected from the wearable device and charge the wearable device when the battery module is connected to the wearable device.

According to examples, a charging interface for a wearable device may include a receiver coil arranged inside the wearable device, the receiver coil to generate a charging voltage for the wearable device via magnetic induction from a transmitter coil external to the wearable device; and a first magnet having a first polarity axis and positioned at a top portion of the receiver coil, and a second magnet having a second polarity axis and positioned at a bottom portion of the receiver coil. The first polarity axis and the second polarity axis of the first magnet and the second magnet, respectively, may be aligned with an attachment plane between the receiver coil and the transmitter coil. The first polarity axis and the second polarity axis may be reversed with respect to each other.

According to examples, the receiver coil may include at least one of two helical coils arranged with parallel longitudinal axes; a single helical coil; or two flat spiral coils arranged side-by-side in a coil plane. The receiver coil may further include at least one of a bracket-shaped ferromagnetic core inside the two helical coils; a ferromagnetic core inside the single helical coil; or a ferromagnetic backplate attached to the two flat spiral coils. The receiver coil may be incorporated into a removable battery module and may generate a first charging voltage to charge the battery module via magnetic induction from the transmitter coil when the battery module is disconnected from the wearable device; and generate a second charging voltage to charge the wearable device at another receiver coil via magnetic induction when the battery module is connected to the wearable device.

According to examples, a method for wirelessly charging a wearable device may include aligning, via two pairs of magnets, a transmitter coil arranged outside the wearable device with a first receiver coil arranged inside the wearable device; and generating a charging voltage at the first receiver coil for the wearable device via magnetic induction from the transmitter coil. The two pairs of magnets may include a first magnet having a first polarity axis and positioned at a top portion of the transmitter coil, a second magnet having a second polarity axis and positioned at a bottom portion of the transmitter coil, a third magnet having a third polarity axis and positioned at a top portion of the first receiver coil, and a fourth magnet having a fourth polarity axis and positioned at a bottom portion of the first receiver coil. The first polarity axis, the second polarity axis, the third polarity axis, and the fourth polarity axis of the first magnet, the second magnet, the third magnet, and the fourth magnet, respectively, may be aligned with an attachment plane between the transmitter coil and the first receiver coil. The first polarity axis and the third polarity axis may be reversed with respect to each other, and the second polarity axis and the fourth polarity axis may be reversed with respect each other.

According to examples, the transmitter coil may be arranged inside an enclosure at one end of a charging cable; a charging-capable case for the wearable device; or a charging station. The method may further include aligning the transmitter coil with a second receiver coil coupled to a battery module; generating a charging voltage at the second receiver coil to charge the battery module via magnetic induction from the transmitter coil; and charging the wearable device via magnetic induction between the first receiver module acting as a transmitter coil and the second receiver coil when the battery module is connected to the wearable device.

According to examples, the transmitter coil may include at least one of two helical coils arranged with parallel longitudinal axes; a single helical coil; or two flat spiral coils arranged side-by-side in a coil plane. The transmitter coil may further include at least one of a bracket-shaped ferromagnetic core inside the two helical coils; a ferromagnetic core inside the single helical coil; or a ferromagnetic backplate attached to the two flat spiral coils. The receiver coil may include at least one of a single helical coil; or two flat spiral coils arranged side-by-side in a coil plane. The receiver coil may further include at least one of a ferromagnetic core inside the single helical coil; or a ferromagnetic backplate attached to the two flat spiral coils.

According to examples, a method of making the wireless charging interface is described herein. A system of making the wireless charging interface is also described herein. A non-transitory computer-readable storage medium may have an executable stored thereon, which when executed instructs a processor to perform the methods described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A charging interface of a near-eye display device, comprising:
    a transmitter coil positioned inside a separation protrusion in a charging-capable case for the near-eye display device, the transmitter coil comprising:
        a first helical coil;
        a first magnet having a first polarity axis and positioned at a top portion of the transmitter coil, and a second magnet having a second polarity axis and positioned at a bottom portion of the transmitter coil; and
        a first core; and a receiver coil positioned inside a tip portion of a temple of the near-eye display device, the receiver coil comprising:
        a second helical coil;
        a third magnet having a third polarity axis and positioned at a top portion of the receiver coil, and a fourth magnet having a fourth polarity axis and positioned at a bottom portion of the receiver coil, wherein:
            the first polarity axis, the second polarity axis, the third polarity axis, and the fourth polarity axis associated with the first magnet, the second magnet, the third magnet, and the fourth magnet, respectively, are aligned with an attachment plane between the transmitter coil and the receiver coil;
            the first polarity axis and the third polarity axis are reversed with respect to each other;
            the second polarity axis and the fourth polarity axis are reversed with respect each other;
            the third polarity axis and the fourth polarity axis are reversed with respect to each other; and
            the first magnet, the second magnet, the third magnet, and the fourth magnet are parallel with the attachment plane such the receiver coil and the transmitter coil couple independent of their respective orientation; and
        a second core, wherein the transmitter coil is to generate a charging voltage for the near-eye display device via magnetic induction in the receiver coil independent of a folding configuration of the temple of the near-eye display device.

2. The charging interface of claim 1, wherein the separation protrusion is positioned in the charging-capable case to separate two temples of the near-eye display device in the folding configuration.

3. The charging interface of claim 1, wherein one or more of a length, a radius, and a core material of the receiver coil are selected, at least in part, based on a size and weight limitation of the temple of the near-eye display device.

4. The charging interface of claim 1, wherein one or more of a length, a radius, and a core material of the transmitter coil are selected, at least in part, based on a size and of the separation protrusion.

5. The charging interface of claim 1, wherein the transmitter coil is further positionable inside an enclosure at one end of a charging cable or a charging station.

6. The charging interface of claim 1, wherein the receiver coil is further to receive a charging voltage from a wirelessly charging capable battery.

7. A charging interface for a wearable device, comprising:
    a receiver coil arranged inside the wearable device;
    a transmitter coil arranged outside the wearable device, wherein the transmitter coil is to generate a charging voltage for the wearable device via magnetic induction with the receiver coil;
    a first magnet having a first polarity axis and positioned at a top portion of the transmitter coil, and a second magnet having a second polarity axis and positioned at a bottom portion of the transmitter coil; and
    a third magnet having a third polarity axis and positioned at a top portion of the receiver coil, and a fourth magnet having a fourth polarity axis and positioned at a bottom portion of the receiver coil, wherein:
        the first polarity axis, the second polarity axis, the third polarity axis, and the fourth polarity axis associated with the first magnet, the second magnet, the third magnet, and the fourth magnet, respectively, are aligned with an attachment plane between the transmitter coil and the receiver coil;

the first polarity axis and the third polarity axis are reversed with respect to each other;

the second polarity axis and the fourth polarity axis are reversed with respect each other;

the third polarity axis and the fourth polarity axis are reversed with respect to each other; and the first magnet, the second magnet, the third magnet, and the fourth magnet are parallel with the attachment plane such the receiver coil and the transmitter coil couple independent of their respective orientation.

8. The charging interface of claim 1, wherein the transmitter coil comprises at least one of:

two helical coils arranged with parallel longitudinal axes and a bracket-shaped ferromagnetic core inside the two helical coils;

a single helical coil and a ferromagnetic core inside the single helical coil; or two flat spiral coils arranged side-by-side in a coil plane a ferromagnetic backplate attached to the two flat spiral coils.

9. The charging interface of claim 7, wherein the receiver coil comprises at least one of:

two helical coils arranged with parallel longitudinal axes and a bracket-shaped ferromagnetic core inside the two helical coils;

a single helical coil and a ferromagnetic core inside the single helical coil; or two flat spiral coils arranged side-by-side in a coil plane and a ferromagnetic backplate attached to the two flat spiral coils.

10. The charging interface of claim 7, wherein the transmitter coil is arranged inside:

an enclosure at one end of a charging cable;

a charging-capable case for the wearable device;

a charging station; or a wirelessly charging capable battery.

11. The charging interface of claim 7, wherein the receiver coil is incorporated into a removable battery and is to:

receive a first charging voltage to charge the removable battery via magnetic induction from the transmitter coil when the removable battery is disconnected from the wearable device; and generate a second charging voltage to charge the wearable device at another receiver coil via magnetic induction when the removable battery is connected to the wearable device.

12. The charging interface of claim 7, wherein the wearable device is one of a near-eye display device, a smartwatch, or a handheld controller.

13. A method for wirelessly charging a wearable device, the method comprising:

aligning a transmitter coil arranged outside the wearable device with a first receiver coil arranged inside the wearable device via a first pair of magnets and a second pair of magnets, wherein:

the first pair of magnets comprise:

a first magnet having a first polarity axis and positioned at a top portion of the transmitter coil and a second magnet having a second polarity axis and positioned at a bottom portion of the transmitter coil;

the second pair of magnets comprise:

a third magnet having a third polarity axis and positioned at a top portion of the first receiver coil and a fourth magnet having a fourth polarity axis and positioned at a bottom portion of the first receiver coil;

the first polarity axis, the second polarity axis, the third polarity axis, and the fourth polarity axis of the first magnet, the second magnet, the third magnet, and the fourth magnet, respectively, are aligned with an attachment plane between the transmitter coil and the first receiver coil;

the first polarity axis and the third polarity axis are reversed with respect to each other, the second polarity axis and the fourth polarity axis are reversed with respect each other, the third polarity axis and the fourth polarity axis are reversed with respect to each other, and the first magnet, the second magnet, the third magnet, and the fourth magnet are parallel with the attachment plane such the first receiver coil and the transmitter coil couple independent of their respective orientation; and generating a charging voltage at the first receiver coil for the wearable device via magnetic induction from the transmitter coil.

14. The method of claim 13, further comprising:

aligning the transmitter coil with a second receiver coil coupled to a wirelessly charging-capable battery;

generating a charging voltage at the second receiver coil to charge the wirelessly charging-capable battery via magnetic induction from the transmitter coil; and charging the wearable device via magnetic induction between the second receiver coil acting as the transmitter coil and the first receiver coil when the wirelessly charging-capable battery is connected to the wearable device.

15. The method of claim 13, wherein the transmitter coil is arranged inside:

an enclosure at one end of a charging cable;

a charging-capable case for the wearable device;

a charging station; or a wirelessly charging capable battery.

16. The method of claim 13, wherein the transmitter coil comprises at least one of:

two helical coils arranged with parallel longitudinal axes;

a single helical coil; or two flat spiral coils arranged side-by-side in a coil plane.

17. The method of claim 16, wherein the transmitter coil further comprises at least one of:

a bracket-shaped ferromagnetic core inside the two helical coils;

a ferromagnetic core inside the single helical coil; or a ferromagnetic backplate attached to the two flat spiral coils.

18. The method of claim 13, wherein the first receiver coil comprises at least one of:

a single helical coil; or two flat spiral coils arranged side-by-side in a coil plane.

19. The method of claim 18, wherein the first receiver coil further comprises at least one of:

a ferromagnetic core inside the single helical coil; or a ferromagnetic backplate attached to the two flat spiral coils.

20. The method of claim 13, further comprising:

facilitating a low speed data exchange through the transmitter coil and the first receiver coil.

* * * * *